United States Patent
Arora et al.

(10) Patent No.: US 12,282,539 B2
(45) Date of Patent: *Apr. 22, 2025

(54) DELEGATED BIOMETRIC AUTHENTICATION

(71) Applicant: Visa International Service Association, San Francisco, CA (US)

(72) Inventors: Sunpreet Singh Arora, San Mateo, CA (US); Maliheh Shirvanian, Cupertino, CA (US)

(73) Assignee: Visa International Service Association, San Francisco, CA (US)

( * ) Notice: Subject to any disclaimer, the term of this patent is extended or adjusted under 35 U.S.C. 154(b) by 453 days.

This patent is subject to a terminal disclaimer.

(21) Appl. No.: 17/703,115

(22) Filed: Mar. 24, 2022

(65) Prior Publication Data

US 2022/0215086 A1 Jul. 7, 2022

Related U.S. Application Data

(63) Continuation of application No. 16/589,609, filed on Oct. 1, 2019, now Pat. No. 11,321,445.

(51) Int. Cl.
*G06F 21/00* (2013.01)
*G06F 21/45* (2013.01)
*H04L 9/40* (2022.01)

(52) U.S. Cl.
CPC .......... *G06F 21/45* (2013.01); *H04L 63/0861* (2013.01); *H04L 63/0884* (2013.01)

(58) Field of Classification Search
CPC ..... G06F 21/45; G06F 21/32; H04L 63/0861; H04L 63/0884; H04L 9/0891; H04L 9/3231
See application file for complete search history.

(56) References Cited

U.S. PATENT DOCUMENTS 9,935,948 B2    4/2018    Schultz et al.
10,313,317 B2    6/2019    O'Regan et al.
(Continued)

FOREIGN PATENT DOCUMENTS

CN    101369892 A    2/2009
KR    20110065139 A    6/2011
(Continued)

OTHER PUBLICATIONS

EP20872369.2, "Extended European Search Report", Oct. 27, 2022, 8 pages.
(Continued)

*Primary Examiner* — Kendall Dolly
(74) *Attorney, Agent, or Firm* — Kilpatrick Townsend & Stockton LLP

(57) ABSTRACT

A delegated biometric authentication system and related methods are disclosed. Using the system, a user can securely delegate biometric authentication to a public device from his communication device. This public device may be an Internet of things device that is not owned by the user, such as a computer, smart TV, tablet, etc. The public device may operate in a public place, such as a hotel or library. The communication device may be the users own smartphone or tablet, etc. A fuzzy vault process can be used to store the user's biometric template in the system Embodiments preserver the user's privacy without compromising authentication security and user convenience.

20 Claims, 10 Drawing Sheets

(56) References Cited

U.S. PATENT DOCUMENTS

| | | | |
|---|---|---|---|
| 10,826,686 B1* | 11/2020 | Cho | H04L 63/0861 |
| 11,321,445 B2 | 5/2022 | Arora et al. | |
| 12,074,974 B2* | 8/2024 | Palanisamy | H04L 9/3213 |
| 2006/0163344 A1 | 7/2006 | Nwosu | |
| 2017/0169424 A1 | 6/2017 | Maddocks et al. | |
| 2019/0356489 A1* | 11/2019 | Palanisamy | H04L 63/0876 |
| 2020/0275267 A1* | 8/2020 | Wang | G06Q 20/3224 |
| 2021/0234848 A1* | 7/2021 | Harris | H04W 12/06 |
| 2022/0156742 A1* | 5/2022 | Gupta | G06Q 20/202 |
| 2023/0062507 A1* | 3/2023 | Aabye | H04L 9/3271 |
| 2023/0342776 A1* | 10/2023 | O'Kane | G06Q 20/204 |
| 2023/0394482 A1* | 12/2023 | Scott | G06Q 20/023 |

FOREIGN PATENT DOCUMENTS

| | | | | |
|---|---|---|---|---|
| WO | 2008069475 A1 | 6/2008 | | |
| WO | WO-2018156068 A1 * | 8/2018 | | G06F 21/32 |
| WO | 2018222211 A1 | 12/2018 | | |

OTHER PUBLICATIONS

Rathgeb et al., "A Survey on Biometric Cryptosystems and Cancelable Biometrics", Eurasip Journal on Information Security, vol. 2011, No. 1, Jan. 1, 2011, 25 pages.

EP20872369.2, "Supplementary European Search Report", Nov. 15, 15, 1 page.

EP Application No. 20872369.2, "Extended Search Report", Oct. 27, 2022, 9 pages.

U.S. Appl. No. 16/589,609 , "First Action Interview Pilot Program Pre-Interview Communication", Oct. 29, 2021, 5 pages.

U.S. Appl. No. 16/589,609 , "Notice of Allowance", Dec. 29, 2021, 11 pages.

Chabanne et al., "Delegating Biometric Authentication with the Sumcheck Protocol", WISTP 2016: Information Security Theory and Practice, Lecture Notes in Computer Science, vol. 9895, Sep. 2016, pp. 236-244.

Gabhane et al., "Biometric Template Security Scheme using Fuzzy Vault", International Journal of 6 Science and Research (IJSR), Computer Science & Engineering, vol. 5, Issue 3, Mar. 2016, pp. 2058-2060.

Gritti et al., "Privacy-Preserving Delegable Authentication in the Internet of Things", Proceedings of the 34th ACM/SIGAPP Symposium on Applied Computing, Apr. 2019, pp. 861-869.

Juels et al., "A Fuzzy Vault Scheme", RSA Laboratories Bedford, MA 01730, USA, and MIT Laboratory for Computer Science 200 Technology Square, Cambridge, MA 02139, 18 pages.

Nandakumar et al, "Fingerprint-based Fuzzy Vault: Implementation and Performance", Apr. 16, 2007, Appeared in IEEE Transactions on Information Forensics and Security, Dec. 2007, 33 pages.

PCT/US2020/053032 , "International Search Report and Written Opinion", Jan. 15, 2021, 11 pages.

Uludag et al., "Fuzzy Vault for Fingerprints", Springer-Verlag Berlin Heidelberg 2005, T. Kanade, A. Jain, and N.K. Ratha (Eds.): AVBPA 2005, LNCS 3546, pp. 310-319, 2005.

Yun , "The Biometric Signature Delegation Method with Undeniable Property", Journal of Digital Convergence, vol. 12, Issue 1, Jan. 2014, pp. 389-395.

SG11202202913T , "Written Opinion", Jan. 8, 2025, 6 pages.

\* cited by examiner

DELEGATED BIOMETRIC AUTHENTICATION

This application is continuation application of U.S. patent Application Ser. No. 16/589,609, filed Oct. 1, 2019, which is herein incorporated by reference in its entirety.

BACKGROUND

"Biometrics" may refer to body measurements that can be used to identify or authenticate individuals. Improvements to sensor technology including digital cameras have enabled biometrics to be more readily used in authentication processes. Some brands of smartphones, for example, can be locked or unlocked using facial recognition, Recent trends suggest that biometrics, as opposed to more conventional authentication information (e.g., passwords, personal identification numbers (PINs), etc.) may become more commonly used for authentication in the future. While a password can be memorized and stolen by a fraudster, it is generally more difficult to acquire or fake biometric information, such as an iris, retina, face, or thumbprint scan.

In some cases, biometric authentication may offer increased convenience for users. For example, in a conventional system, a user could authenticate by actively entering a password into a terminal, while in a biometric authentication system, a user could instead passively look into a camera. Doing so may be less effortful, and quicker and more convenient for users.

Relatedly, improvements in processing and networking technology have led to a proliferation of smart, connected devices, such as internet of things (IoT) devices. These devices offer users increased convenience in a variety of different ways. A smart television, for example, can allow users to conveniently purchase pay-per-view content, and a smart thermostat can allow users to control the temperature of their house while away from home.

IoT devices, as well as other public devices, are becoming increasingly common in public spaces, such as hotels, libraries, airplanes, the back of taxis or ride-shares, etc. These public devices may be used by users during their stay in these public spaces, e.g., during a vacation, a trip to the library, a ride to the airport, etc. Many of these public devices allow users to perform interactions, such as checking out a library book or purchasing pay-per-view content from a hotel smart TV. These interactions may involve authentication, particular biometric-based authentication.

However, there is an inherent security risk associated with using sensitive authentication information, such as biometrics, on devices that are not owned by users corresponding to those biometrics. For example, a user's smartphone typically stay in the user's possession and only be accessed by the user, while a hotel's smart TV may be accessed by hundreds or thousands of users, including potential hackers or fraudsters.

Embodiments address these and other problems, individually and collectively.

SUMMARY

Embodiments are directed to a delegated biometric authentication system and related methods. Embodiments allow users to use public devices for biometric authentication without compromising user security and privacy. In doing so, sensitive biometric information (e.g., biometric templates) and interaction tokens (e.g., payment tokens, including limited use or limited time tokens) are protected without sacrificing user convenience.

Some embodiments include devices associated with the delegated biometric system, including a communication device associated with a user (e.g., a smartphone, laptop, etc.), a public device (e.g., a public IoT device associated with a public space, such as a hotel smart TV, a terminal for checking out books at a library, etc.), an authentication server computer and a token server computer. In some embodiments, the authentication server computer may be used to validate that a user's communication device is connected (using NFC for instance) to a registered public IoT device during a setup phase. Subsequently, the authentication server can control the process (e.g. request the cleanup process on IoT device). In some embodiments, the and token server computer can issue access data such as interaction tokens (such as payment tokens) and/or master secret keys.

By using the delegated authentication system, a user can delegate biometric authentication to the public device, such that the user can use the public device in order to authenticate themselves using a biometric (e.g., a face scan, iris scan, retina scan, thumbprint scan, voice recording, a handwritten signature, etc.). This may allow the user to securely and conveniently perform interactions that require some form of authentication (e.g., purchasing, borrowing library books, accessing email or bank accounts, etc.).

Embodiments may make use of fuzzy extractor schemes such as fuzzy vault schemes. These fuzzy vault schemes may be used to securely store sensitive information (such as an interaction token) in the form of a data vault. The sensitive data may be locked using other information or data (e.g., a biometric template), which may be considered a key. A user can unlock the data vault by providing a key in the form of a biometric template to the public device (e.g., by performing a face scan using a digital camera attached to the public device. Because the interaction token is locked in the data vault using a biometric template associated with the user, other users cannot access and misuse the interaction token (e.g., by the interaction token to make unauthorized purchases). Moreover, because the data vault does not store the biometric template or the interaction token in plaintext form, a hacker or other malicious user cannot access the memory of the public device in order to steal either the biometric template or the interaction token. Thus the delegated authentication system provides for greater security and convenience for users using public devices.

One embodiment is directed to a method comprising: receiving, by a public device, from a user, a request to perform an interaction with a resource provider; collecting, by the public device, from the user, a first biometric template corresponding to the user; unlocking, by the public device, a data vault using the first biometric template, wherein the data vault comprises an interaction token cocked using a second biometric template corresponding to the user; transmitting, by the public device; the interaction token to the resource provider; and performing, by the public device, the interaction with the resource provider.

Another embodiment is directed to a public device comprising: a processor; and a non-transitory computer readable medium coupled to the processor, the non-transitory computer readable medium comprising code, executable by the processor for implementing the above-noted method.

Another embodiment is directed to a method comprising, receiving, by a communication device associated with a user, from the authentication server computer or a token server computer, an interaction token; generating, by the communication device, a fuzzy vault by locking the interaction token using a biometric template corresponding to the user; and transmitting, by the communication device, the data vault to the public device.

Another embodiment is directed to a method comprising: receiving, by an authentication server computer, from a public device, a validation request message, the validation request message including an identifier of a communication device associated with a user; transmitting, by the authentication server computer, to the communication device, a delegation confirmation message; receiving, by the authentication server computer, from the communication device, a delegation confirmation response; transmitting, by the authentication server computer, to a token server computer, a request for an interaction token; receiving, by the authentication server computer, from the token server computer, an interaction token; and transmitting, by the authentication server computer, to the communication device, the interaction token, wherein the communication device locks the interaction token in a data vault using a biometric template associated with the user.

TERMS

Prior to discussing specific embodiments of the invention, some terms may be described in detail.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

A 'memory' may include suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "processor" may include an suitable data computation device or devices. A processor may comprise one or more microprocessors working together to accomplish a desired function. The processor may include a CPU that comprises at least one high-speed data processor adequate to execute program components for executing user and/or system-generated requests. The CPU may be a microprocessor such as AMD's Athlon. Duron and/or Opteron; IBM and/or Motorola's PowerPC: IBM's and Sony's Cell processor; Intel's Celeron Itanium, Pentium, Xeon and/or XScale; and/or the like processor(s).

A "communication device" may include any electronic device that may provide communication capabilities including communication over a mobile phone (wireless) network, wireless data network (e.g., 3G, 4G, or similar networks), Wi-Fi, Wi-Max, or any other communication medium that may provide access to a network such as the Internet or a private network. Examples of communication devices include mobile phones (e.g., cellular phones), PDAs, tablet computers, net books, laptop computers, personal music players, hand-held specialized readers, wearable devices (e.g., watches), vehicles (e.g., cars), etc. A communication device may compose any suitable hardware and software for performing such functions, and may also include multiple devices or components (e.g., when a device has remote access to a network by tethering to another device—i.e. using the other device as a relay both devices taken together may be for a single communication device). A communication device may store and capture biometric templates, using, for example, a camera to capture a facial scan or a touch screen to capture a finger print. A mobile device may store biometric templates on a secure memory element. A communication device can be a "private device" of the user. A private device of a user may be on which is solely used by a single user.

A "biometric template" can be a digital reference of distinct characteristics that have been extracted from a biometric instance. Templates are used during the biometric authentication process.

A "fuzzy extractor" may be a biometric tool that allows for user authentication, using a biometric template constructed from the user's biometric data as the key. A fuzzy vault or fuzzy vault scheme may be an example of a fuzzy extractor.

A "fuzzy vault" or "fuzzy vault scheme" can be a method of providing secure authentication based on fuzzy matching of sets. A fuzzy vault can be an encryption scheme which leverages some of the concepts of error correction codes, to encode information in such a way as to be difficult to obtain without the 'key' used to encode it, even if the methods used for encoding are publicly known. The encoded information may be in the form of a data vault. Fuzzy vaults are also described in A. Juels and M. Sudan, "A Fuzzy Vault Scheme," *Proc. IEEE Intl Symp. Inf. Theory*, A. Lapidoth and E. Teletar, Eds., pp 408, 2002; K. Nandakumar et al., "Fingerprint-based fuzzy vault: Implementation and performance," IEEE Transactions on Information Forensics and Security (December 2007), and U. Uludag et al "Fuzzy Fingerprint Vault", *Proc Workshop: Biometrics: Challenges Arising from Theory to Practice*, pp 13-16, 2004.

A "data vault" may be a secure encoding of data. Data in a data vault may e secured in a form, such that the data can only be obtained with a correct key. A data vault may be encrypted data, and in some embodiments, the data vault may be formed using a fuzzy vault scheme.

A "public device" can be a device that is not specifically designated for use by a single user, but is generally used by many users. As such, the data security that may be provided to a public device can be less than a device that is specifically associated with a user.

A "user" may include an individual. In some embodiments, a user may be associated with one or more personal accounts and/or mobile devices. The user may also be referred to as a cardholder, account holder, or consumer.

A "biometrics instance" may include information related to a biological observation. A biometric instance may include biometric data corresponding to a biometric sample. A "biometric template" may be derived from the biometric instance. A biometric instance may be captured via a "biometric interface," hardware used to capture biometric instances. For example, a biometric instance may be captured via a biometric interface such as an iris scanner, comprising an infrared light source and a camera. Examples of biometric instances include digital representations of iris scans (e.g., binary codes that represent an iris), fingerprints, voice recordings, face scans, etc.

A "resource provider" may include any entity that can provide resources such as goods, services, information and/or access. Examples of resource providers include merchants, governmental entities, entities that provide access to secure locations, data access providers, etc. A "merchant"

may be an entity that engages in transactions and can sell goods or services, or provide access to goods or services.

An acquire may include a business entity (e.g., a commercial bank) that has a business relationship with a particular merchant or other entity. Some entities can perform both issuer and acquirer functions. Some embodiments may encompass such single entity issuer acquirers. An acquirer may operate an acquirer computer, which can also be generically referred to as a "transport computer."

An "authorizing entity" may include any entity that authorizes a request Examples of an authorization entities may include issuers, governmental agencies, document repositories, access administrators, etc. An "issuer" may typically refer to a business entity (e.g., a bank) that maintains an account for a user. An issuer may also issue payment credentials stored on a mobile device, such as a cellular telephone, smart cart card, tablet, or laptop to the consumer. An authorizing entity may operate authorization computer.

"Authentication data" may include any data suitable for proving that something is true and valid. Authentication data may be obtained from a user or a device that is operated by the user. Examples of authentication data obtained from a user may include PINs (personal identification numbers) passwords, etc. Examples of authentication data that may be obtained from a mobile device may include device serial numbers, hardware security element identifiers, device fingerprints, phone numbers. IMEI numbers, biometric templates stored on the mobile device, etc.

A "payment device" may include any suitable device that may be used to conduct a financial transaction, such as to provide payment credentials to a merchant. The payment device may be a software object, a hardware object, or a physical object. As examples of physical objects, the payment device may comprise a substrate such as a paper or plastic card, and information that is printed, embossed, encoded, or otherwise included at or near a surface of an object. A hardware object can relate to circuitry (e.g., permanent voltage values), and a software object can relate to non-permanent data stored on a device. A payment device may be associated with a value such as a monetary value, a discount, or store credit, and a payment device may be associated with an entity such as a bank, a merchant, a payment processing network, or a person. A payment device may be used to make a payment transaction. Suitable payment devices can be hand-held and compact so that they can fit into a user's wallet and/or pocket (e.g., pocket-sized) Example payment devices may include smart cards, magnetic stripe cards, keychain devices (such as the Speedpass™ commercially available from Exxon-Mobil Corp), etc. Other examples of mobile devices include pagers, payment cards, security cards, access cards, smart media, transponders, and the like if the payment device is in the form of a debit, credit, or smartcard, the payment device may also optionally have features such as magnetic stripes. Such devices can operate in either a contact contactless mode. In some embodiments, a mobile device can function as a payment device (e.g., a mobile device can store and able to transmit payment credentials for a transaction).

"Access data" may include any suitable data that can be used to access a resource. Access data may be in any suitable form. Examples of access data may include credentials (e.g., to such as interaction tokens), master secret keys that may be used to decrypt interaction tokens, etc. In embodiments, the use of master secret keys can be desirable. The benefit of this is that the master key can be of a predefined fixed format (e.g. 256 bit key) while the interaction token can be generic; so this makes the framework extensible/scale.

A "credential" or may include any suitable information that serves as reliable evidence of worth, ownership, identity or authority. An "access credential" may be a credential that may be used to gain access to a particular resource (e.g., a good, service location, etc.). A credential may be a string of numbers, letters, or any other suitable characters, or any object or document that can serve as confirmation. Examples of credentials include identification cards, certified documents, access cards, passcodes and other login information, payment account numbers, access badge numbers, payment tokens, access tokens, etc.

"Payment credentials" may include any suitable information associated with an account (e.g., a payment account and/or payment device associated with the account). Such information may be directed related to the account or may be derived from information related to the account. Examples of account information may include a PAN (primary account number or "account number"), user name, expiration date, CVV (card verification value), dCVV (dynamic card verification value), CVV2 (card verification value 2), etc. Payment credentials may be any information that identifies or is associated with a payment account. Payment credentials may be provided in order to make a payment from a payment account. Payment credentials can also include a user name, an expiration date, a gift card number or code, and any suitable information.

An "interaction token" may include any substitute value for a real credential that can be used in an interaction. A token may be a type of credential, and may be a string of numbers, letter or any other suitable characters. Examples of tokens include payment tokens, personal identification tokens, etc.

A "payment token" may include any identifier for a payment account that is a substitute for an account identifier, such as a primary account number (PAN). For example, a token may include a series of alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifier used in existing transaction processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generate such that the recovery of the original PAN or other account identifier from the token value may not be computationally derived. Further, in some embodiments, the token format may be configured to allow the entity receiving the token to identify it as a token and recognize the entity that issued the token.

An "authorization request message" may include any electronic message that is sent, to request authorization for a transaction. In some embodiments, an authorization request message may be an electronic message that is sent to a payment processing network and/or an issuer of a payment card to request authorization for a transaction. An authorization request message according to some embodiment may comply with ISO 8583, which is a standard for systems that exchange electronic transaction information associated with a payment made by a consumer using a payment device or payment account. The authorization request message may include an issuer account identifier that may be associated with a payment device or payment account. An authorization request message may also comprise additional data elements corresponding to "identification information" including, by way of example only a service code, a CNN (card verification value), a dCVV (dynamic card verification value), an expiration date, etc. An authorization request message may also comprise "transaction information," such as any information associated with a current transaction, such as the transaction amount, merchant identifier, merchant location, etc., as well as any other information that may be utilized in determining whether to identify and/or authorize a transaction.

An "authorization response message" may include any electronic message reply to an authorization request message, it may be generated by an issuing financial institution or a payment processing network. The authorization response message may include, by way of example only, one or more of the following status indicators: Approval—transaction was approved; Decline—transaction was not approved: or Call Center—response pending more information, merchant must call the toll-free authorization phone number. The authorization response message may also include an authorization code, which may be a code that a credit card issuing bank returns in response to an authorization request message in an electronic message (either directly or through the payment processing network) to the merchant's access device (e.g., POS equipment) that indicates approval of the transaction. The code may serve as proof of authorization.

A "device code" or "device identifier" may include any code that is specifically associated with a device (e.g., only one device), The device code can be derived from any device specific information including, but not limited to include one or more of a secure element identifier (SE ID), an IMEI number, a phone number, a geo-location, a device serial number, a device fingerprint, etc. Such codes may be derived from such information using any suitable mathematical operation including hashing and/or encryption. Device codes may include any suitable number and/or type of characters.

DETAILED DESCRIPTION

Figure 1:
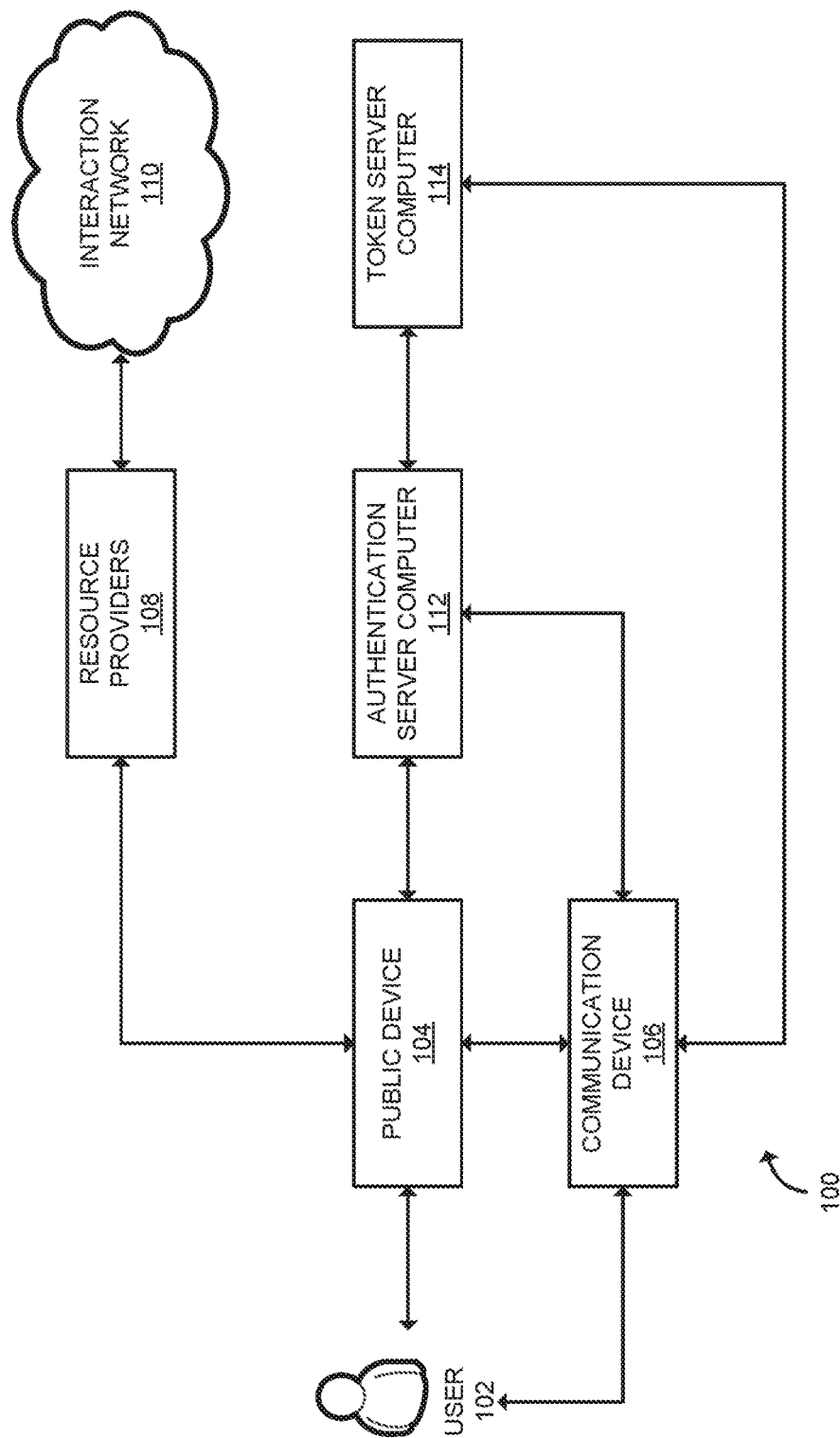
FIG. 1 shows a system block diagram of a delegated biometric authentication system according to some embodiments.

Embodiments are directed to methods and systems enabling a user to conduct interactions with resource providers via a public device. The public device may comprise a computer or Internet of Things (IOT) device that is used by a variety of users or is situated in a public space. Smart TVs in hotel rooms, computers in libraries, and security terminals at apartment complexes are all examples of public devices.

Embodiments can be used to conduct a variety of different types of interactions. As an example, embodiments can be used to conduct transaction interactions between users and resource providers. For example, a guest at a hotel room could use a public smart, TV in order to purchase a pay-per-view boxing match from a broadcasting company resource provider. Embodiments can also be used to conduct non-transactional interactions between users and resource providers. For example, a user at a library could use a public library computer as part of a check out interaction, in order to borrow a book, from the library. These interactions may involve the use of an interaction token a credential that can be used by the user in order to authorize interactions.

These interactions may first require user authentication. Authentication has several benefits, including fraud prevention. The authentication may be performed using biometrics, such as iris scans, face scans, etc. Biometrics can be more secure than conventional authentication information (such as usernames, passwords, answers to security questions, etc.) and more convenient for users, as they can be collected passively (e.g., by a device taking a picture of the user's face) rather than actively (e.g., the user entering a password into a computer system via a keyboard).

Embodiments also include methods for performing a biometric authentication delegation process that enables the public device to be used for biometric authentication. Conventionally, public devices may be too insecure to perform biometric authentication, as users and resource providers don't trust the public device, or malicious users of the public device, not to steal or misuse sensitive data (such as interaction tokens and biometric templates). However, embodiments provide for methods of performing delegated biometric authentication, which involves additional security and privacy measures that enable public devices to be used for biometric authentication.

These additional security and privacy measures include the use of data vaults formed using fuzzy vault schemes, A data vault formed using a fuzzy vault scheme can lock an interaction token or a master secret key used to encrypt the interaction token using a biometric template corresponding to the user. The data vault can be transmitted to the public device, and the public device can use the data vault to perform delegated biometric authentication. The public device can capture a biometric instance sample from the user and can then determine a biometric template from the biometric instance. The public device can then use the biometric template to unlock the data vault. If the data vault is successfully unlocked, the user is biometrically authenticated, and the interaction token (or other access data) can be sent to a resource provider in order to authorize the interaction. Moreover, the data vault cannot be broken by a hacker or malicious user of the public device. As such, the user information including biometric templates and interaction tokens are safe, and users and resource providers can trust the public device to perform delegated biometric authentication during interactions.

FIG. 1 shows an exemplary delegated biometric authentication system 100 according to some embodiments. The system 100 can comprise user 102, public device 104, communication device 106, resource providers 108, interaction network 110, biometric server computer 112, and token server computer 114. The entities of system 100 may be in operative communication with one another via one or more communications network. Additionally, the entities of system 100 may communicate with one another via other suitable means, such as a direct connection, Bluetooth, near field communication (NFC), etc.

A communications network can take any suitable form, which may include any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the entities and computers may be transmitted using a secure communications protocol, such as, but not limited to, File Transfer Protocol (FTP), HyperText Transfer Protocol (HTTP); Secure Hypertext Transfer Protocol (HTTPS); Secure Socket Layer (SSL), ISO (e.g., ISO 8583) and/or the like.

Generally, the delegated biometric authentication system 100 enables the user 102 to conduct interactions with one or more resource providers 108 using public device 104. These interactions may include transactions. For example, a resource provider 108 could comprise a broadcasting company with broadcasting rights to a sports match (e.g., a boxing match), and public device 104 could comprise a smart TV. The user 102 may use public device 104 to purchase the sports match on pay-per-view, allowing user 102 to watch the sports match on public device 104. As another example, a resource provider 108 could, comprise a library that lends books to user 102. Public device 104 could be a terminal that allows user 102 to check out books from resource provider 108 in an interaction. As a third example of an interaction, a resource provider 108 could comprise a budding security group that controls access to a secure building such as an apartment complex. User 102 could use public device 104 (e.g., a security terminal) in order to gain access to the apartment complex.

Further, in order to conduct these interactions using public device 104, public device 104 can authenticate the user 102 using biometrics, that is, verify the user's 102 identity using one or more biometrics corresponding to the user 102 (e.g., an iris scan, retina scan, face scan, fingerprint, etc.). This provides additional security to user 102 by making it more difficult for malicious users or fraudsters to impersonate user 102. Additionally, biometric authentication may provide improved convenience to user 102, as they may be able to conduct interactions without devices typically associated with those interactions, for example, conduct a transaction without using a credit card or borrow a library book without a library card.

Delegated biometric authentication may involve the use of fuzzy vault schemes to produce data vaults. A data vault may refer to some information or data locked using some other information or data. For example, a interaction token (tokenized data used to conduct interactions) locked using a biometric template. In order to access the data locked in the data vault (e.g., the interaction token), the data vault first must be unlocked, for example, using a biometric template corresponding to the biometric template used to form the data vault.

A data vault containing an interaction token corresponding to user 104 and locked using a biometric corresponding to user 102 can be provided to public device 104 by communication device 106. In order to use the interaction token to perform interactions with resource providers 108, the data vault is first unlocked using a biometric template corresponding to user 102. As such, unlocking the data vault is a form of biometric authentication, as the data vault cannot be unlocked without a valid biometric template associated with user 102. Further, without the biometric template, it is hot possible to determine either the interaction token (or master key) locked in the data vault, or the biometric template used to lock the interaction token. As a result, this sensitive information is secure even when stored on a public device 104 outside user's 102 control;

Public device 104 may comprise at Internet of Things (IoT) or other smart device capable of communicating with other devices via networks such as the Internet. Public device 104 may additionally communicate with devices using other means. For example, public device 104 may communicate with communication device 10 via Bluetooth or NFC. Public device 104 may exist in a public or shared space such as a hotel room, library, restaurant, bank, grocery store, etc. Examples of public devices include smart TVs, self-checkout terminals, terminals for checking out library books, ATMs, videogame consoles, laptops, tablets, desktop computers, etc. Public device 104 may be used by a variety of users during the course of its operation. For example a smart TV in a room of a hotel may be used by a first user, and then a subsequent user may use the smart TV after the first user checks out of the room, and so on. Public device 104 may store data vaults corresponding to a variety of users. Further, device 104 may comprise one or more biometric interfaces, which are used to collect biometric instances from users. The biometric instances may be formed into biometric instances, and then biometric templates, which may be used to unlock corresponding data vaults. Public device 104 is described in further detail below with reference to FIG. 8.

User 102 may own and or operate a communication device 106. The communication device 106 may be a personal device associated with user 102. For example, communication device 106 could be a smartphone, laptop, tablet, desktop, etc., owned by user 102. Communication device 106 can comprise a processor, memory, and code or instructions used to perform a variety of functions, including collecting biometric instances, forming biometric templates from biometric instances generated from the biometric instances, generating data vaults, and delegating biometric authentication to public device 104. Communication device 106 may be used by user 102 to perform additional functions, such as making and receiving calls, sending text messages, browsing the Internet, streaming video, etc. Communication device 106 is described in further detail below with reference to FIG. 9.

Resource providers 108 may comprise one or more resource providers that provide resources to users as part of interactions. These resource providers can include, for example, businesses, governments, and non-profit organizations. Examples of resource providers include merchants, that provide goods or services to customers, libraries that lend books to borrowers, building managers that allow access to buildings, broadcasting companies that allow access to broadcast content, etc.

Resource providers 108 may communicate with, or be part of an interaction network 110. An interaction network 110 may comprise entities that are linked or connected together in order to facilitate interactions. For example, a payment processing network can be an interaction network used to process payment interactions. Examples of interaction networks and interactions are described in further detail below with reference to FIGS. 6 and 7. In some embodiments, interaction network 110 may additionally comprise one or more computers or entities shown in FIG. 1, including resource providers 108, authentication server computer 112, token server computer 114, etc.

Authentication server computer 112 may comprise a server computer that can validate user 102 and communication device 106. It can also verify biometric delegation. The authentication server computer 112 may store or otherwise manage a list or registry of users or communication devices enrolled in a biometric authentication system. User 102 may have enrolled communication device 106 in the biometric authentication system at some point in the past. In some embodiments, enrollment with authentication server computer 112 may be a pre-requisite for using system 100 for performing delegated biometric authentication. The authentication server computer 112 may use a list or registry of users in order to verify that user 102 is legitimate (e.g., is not being impersonated by a fraudster). Authentication server computer 112 may communicate with a token server computer 114 in order to provision an interaction token (or other access data) to communication device 106. These interaction tokens (or other access data) may subsequently be locked by communication device 106 in a data vault.

The token server computer 114 may comprise a server computer associated with tokenization services. Token server computer 114 may generate, manage, and distribute interaction tokens that may be used to conduct interactions with resource providers 108. Interaction tokens may comprise, for example, numeric or alphanumeric sequences, such as "4000 1234 5678 9000." Interaction tokens may be subject to any number of limitations assigned and/or enforced by token server computer 114. For example, token server computer 114 may generate limited use tokens, which may be valid for a limited number of interactions (e.g., three interactions). Additionally, token server computer 114 may generate limited time tokens, which may be valid only during a specific time period (e.g., within one week of generation). Further, token server computer 114 may generate limited amount tokens, which may be valid provided an certain amount of something is not exceeded (e.g., for transactions, a limited amount token may correspond to an amount of money, such as $100.00. The limited amount token may be valid provided that less than $100.00 is spent over the course of one or more transactions). In some embodiments, interaction tokens generated by token server computer 114 may be substitutes for other credentials, such as payment credentials like PANs. Token server computer 114 may maintain a secure database relating interaction tokens with the credentials they substitute.

In other embodiments, the token server computer 114 may be an access data providing computer, which may provide other types of access data including master secret keys.

Figure 2:
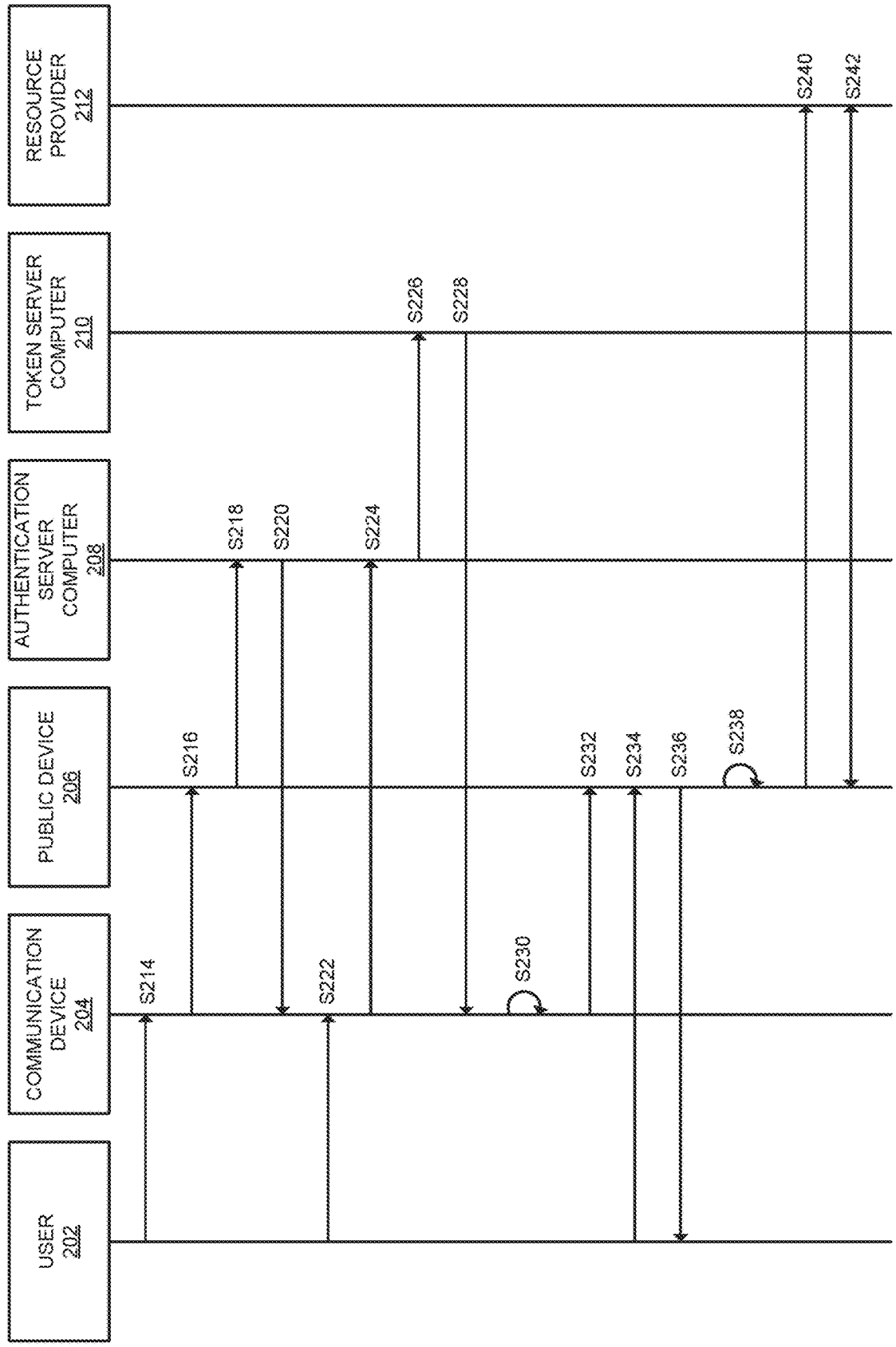
FIG. 2 shows a swim-lane diagram of delegated biometric authentication according to some embodiments.

FIG. 2 shows a sequence diagram of a method of delegated biometric authentication according to some embodiments. Generally, the method involves a communication device 204 using the fuzzy vault technique on a user's second biometric template to generate a data vault that is transmitted to a public device 206. At a later time, when the user 202 wants to perform an interaction (e.g., a transaction) using the public device 206, the user 202 can unlock the data vault with his/her first biometric template on the public device 206. Note that the references to "first" "second, third," etc. in the present application need not imply any particular order or priority, but can rather be used to designate different instantiations of the same type of item.

At step S214, the user 202 can provide a biometric instance to the communication device 204. For example, the user 202 can use a camera on communication device 204 in order to collect a face scan, iris scan or retina scan. Alternatively, the user 202 can, use a microphone on communication device 204 in order to capture a voice recording, or a touch screen on communication device 204 in order, to capture a hand writing sample. The communication device 204 may generate a biometric instance, and then a biometric template, and may then securely store the biometric template on a secure memory element.

At step S216, the public device 206 can receive, from the communication device 204, a delegation request message. The delegation request message may indicate that the user 202 wishes to delegate biometric authentication to the public device 206. The delegation request message may be generated by the communication device 204 via any appropriate means. For example, the communication device 204 may store and execute an application (such as a smart phone application), that enables the user 202 to initiate generation and transmission of the delegation request message. The delegation request message may comprise data or information such as a communication device identifier or a user identifier, enabling the public device 206 to uniquely identify the communication device 204 or user associated with the delegation request message. The communication device 204 may transmit the delegation request message to the public device 206 via any appropriate means, for example, via a network such as a local area network or the Internet. In some embodiments, the user 202 may connect communication device 204 to public device 206 via near field communication, i.e., by bringing communication device 204 in close proximity with a near-field communication element on public device 206. Alternatively, communication device 204 may connect to public device 206 via Bluetooth, Zigbee, Wi-Fi, or any other appropriate networking or communication means.

At step S218, the public device 206 can transmit a validation request message to authentication server computer 208. The validation request message can indicate to authentication server computer 208 that communication device 204 is attempting to delegate biometric authentication to public device 206. The validation request message can further indicate that the public device 206 wants to validate communication device 204 and the delegation request. The validation request message may comprise a communication device identifier and/or a user identifier used to identify communication device 204.

The authentication server computer 208 may maintain a registry of users or communication devices (including user 202 and communication device 204) that are registered or enrolled in a biometric authentication program. User 202 may have previously enrolled communication device 204 in this program. Authentication server computer 208 may verify that communication device 204 is enrolled or registered using a communication device identifier, user identifier, or other appropriate identifier contained in the validation request message.

At step S220, communication device 204 may receive from the authentication server computer, a delegation confirmation message. The delegation confirmation message may indicate that authentication server computer 208 may want communication device 204 or user 202 to confirm that biometric authentication should be delegated to public device 206. The delegation confirmation message may be routed or sent to communication device 204 using a communication device identifier, such as a cell phone number. The delegation confirmation message may be transmitted in any appropriate form, e.g., as a text message, email, or a push notification that is received via an application stored on communication device 204 (e.g., a smart phone application). The delegation confirmation message may be displayed on communication device 204 such that user 202 can read and response to it. The delegation confirmation message may include information such as a name or an identifier of public device 206, along with a prompt, such as a text prompt. For example, the delegation confirmation message could comprise a message such as "Do you want to delegate biometric authentication to hotel smart TV?" along with user interface elements such as a confirmation button or a rejection button.

At step S222, user 202 can provide a response to the delegation confirmation message to communication device 204. For example, user 202 could select a button indicating that user 202 confirms that biometric authentication should be delegated to public device 206, or select a different button indicating that biometric authentication should not be delegated to public device 208. As part of providing a response to the delegation confirmation message, user 202 may provide an additional form of authentication or verification, such as a password, native biometric authentication, or a response to a security question (e.g., "what is your mother's maiden name?").

At step S224, communication device 204 an transmit a delegation confirmation response to authentication server computer 208. The delegation confirmation response can indicate whether or not user 202 confirms biometric authentication delegation.

At step S226, the authentication server computer 208 can transmit a request for an interaction token to a token server computer 210. The interaction token may be used by communication device 204 in order to perform interactions. For example, the interaction token may be used by communication device 204 in order to perform transactions with resource providers (e.g., merchants). The interaction token may be used as a substitute for another payment credential. For example, the interaction token may be used as a substitute for a payment credential such as a PAN (e.g., credit card number). If the interaction token is used as a substitute for a payment credential, the interaction token may be associated in some way with the credential it substitutes. For example, the token server computer 210 may maintain a database or other appropriate data structure that relates interaction tokens to their corresponding payment credentials.

The interaction token may be subject to any number of limitations. For example, the interaction token may be a limited use token that can only be used for a limited number of interactions (e.g., three interactions). For example, if the interaction token is used to check out books at a library, the interaction token may only be used to check out a limited number of books. As another example, if the interaction token is used as a payment token, the interaction token may only be used to perform a limited number of purchases.

The interaction token may also be limited to a time period, such that the interaction token can only be used to perform interactions during that time period. Likewise, the interaction token may be limited to an amount, such as a monetary amount, e.g., $100.00. If the interaction token is used to perform transactions, the interaction token can be used up until the total cost of transactions performed using the interaction token reaches the monetary amount.

Upon receiving the request for an interaction token, the token server computer 210 can generate an interaction token and associated the interaction token with user 202 or communication device 204, e.g., by associating the interaction token with a user identifier, a communication device identifier, or a user account managed by authentication server computer 208 or token server computer 210. The interaction token may comprise any appropriate data that may be used to perform or facilitate interactions. Interaction tokens may comply with any appropriate standards, including ISO 8583 financial transaction message format. If the interaction token is a substitute for another credential, such as a payment credential for example, a PAN, the interaction token may take a form similar to the credential it substitutes. For example, PANS (e.g., credit card numbers) typically take the form of 16 digit numeric sequences. An interaction token that serves as a substitute for a PAN may likewise take the form of a 16 digit numeric sequence. A interaction token may be derived from a credential it substitutes (e.g., an interaction token may be generated by hashing a PAN) or an interaction token may be derived using any other appropriate means, such as a random or pseudorandom number generator.

At step S228, communication device 204 can receive an interaction token from authentication server computer 208 or the token server computer 210. The communication device 204 can securely store the interaction token, e.g., using a mobile wallet application or a secure memory element.

At step S230, communication device 204 can generate a data vault using a fuzzy vault method/technique by locking the interaction token using a biometric template corresponding to user 202. In other embodiments, the communication device 204 can generate a data valid using a fuzzy vault method/technique by locking a master secret key that is generated to encrypt the interaction token. The biometric template can be based off the biometric instance or sample collected from user 202 at step S214. The data vault can be transferred to public device 206 and used by the user 202 to perform biometric authentication and interactions (e.g., transactions) using public device 206.

Figure 4:
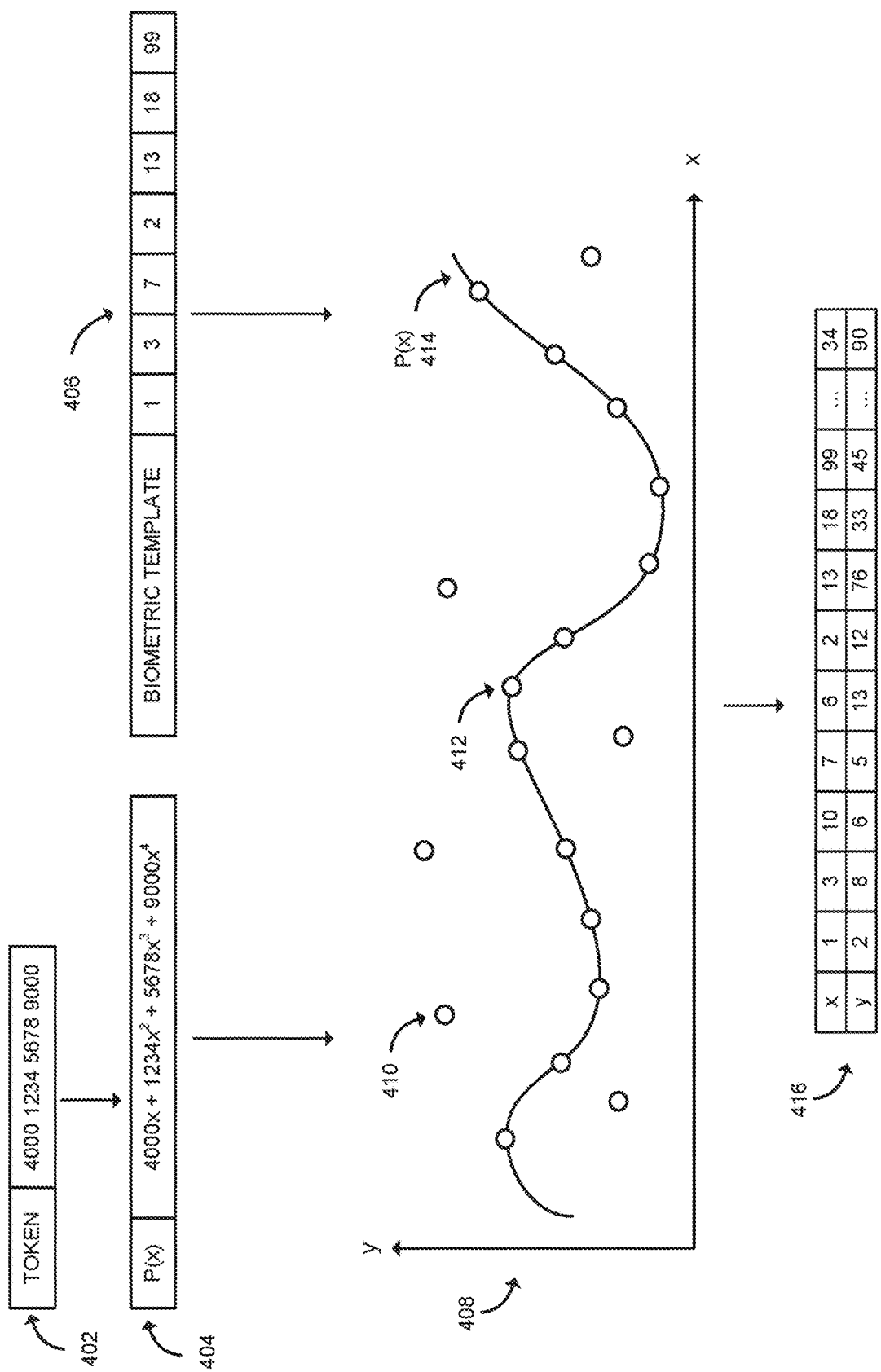
FIG. 4 shows a hybrid diagram of a method of data vault generation according to some embodiments.

Step S230 may be better understood with reference to FIG. 4, which shows a hybrid diagram corresponding to generating or locking a data vault. Generally, a data vault (e.g., data vault 416) comprises an unordered set of points. Each point can comprise two values, labeled in FIG. 4 as "x" and "y." Some points are "random points" or "chaff points." These points may comprise two random values. Other points correspond to data and a function of that data. In embodiments, these other points may be referred to as "biometric points" and may correspond to a biometric template 406 (e.g., biometric template corresponding to a user of the communication device) and a function P(x) 404. The function P(x) 404 may be derived from an interaction token, e.g., interaction token 402. Thus, the data vault may comprise an unordered set of points comprising a plurality of random points and a plurality of biometric points corresponding to a biometric template and an interaction token.

Because the data vault 416 comprises random points, it is not possible to distinguish, by observation alone, which points correspond to the biometric template. As a result, the biometric template cannot be extracted from the data vault. Likewise, because the data vault comprises random points, it is not possible to uniquely determine the function P(x) 404 and the interaction token 402 by observation alone.

A method for generating a data vault using fuzzy vault scheme according to some embodiments is as follows. First, the communication device can generate an encoding function P(x) 404 corresponding to the interaction token 402. In other embodiments, the interaction token can alternatively be a master secret key that can be used to decrypt an encrypted interaction token. In FIG. 4, the interaction token is shown as a 16 digit numeric sequence. The encoding function P(x) 404 can be generated using a number of different techniques. One technique involves generating a polynomial function of X using digits corresponding to interaction token 402. FIG. 4 illustrates an exemplary application of this technique. The encoding function P(x) 404 can be generated by using each block of four consecutive interaction token 402 digits as polynomial coefficients. Polynomial functions may be convenient because there are efficient techniques of generating and interpolating polynomials, which may be used to lock and unlock the vault respectively. However, embodiments can be practiced with functions P(x) 404 other than polynomial functions.

The communication device can then generate a plurality of biometric points by applying the biometric template 406 as an input to the encoding function P(x) 404. The biometric template 406 may comprise a sequence or array of data values corresponding to a biometric. Each data value may be represented numerically, and may be applied as the input to the encoding function R(x) 404. The result is a plurality of P(x) "y" values. These values may be paired with their respective biometric template 406 ("x") values in order to generate the plurality of biometric points. The communication device can likewise generate a plurality of random points, e.g., using a random or pseudo-random number generator.

Graph 408 shows a graphical representation of the data vault. Point 410 is an example of a random point, corresponding to neither encoding function P(x) 404 or biometric template 406. Point 412 is an example of a biometric point, corresponding to biometric template 406 and lying on line 414 corresponding to encoding function P(x) 404.

Data vault 416 shows a representation of the data vault as a two-dimensional array comprising both the plurality of biometric points and the plurality of random points. Data vault 416 may be unordered or shuffled, such that it is not possible to determine which points are random points and which points are biometric points based on the order of points in data vault 416.

Returning to FIG. 2, at step S232, communication device 204 can transmit the data vault to public device 206. The data vault can be transmitted via any appropriate means, e.g., Bluetooth, Wi-Fi, Zigbee. LAN, the Internet, etc.

By the end of step S232, biometric authentication has been successfully delegated to public device 206. At this point, user 202 can use public device 206 in order to perform biometric authentication and perform interactions, Steps S234-S242 correspond to a biometric authentication and interaction process according to some embodiments.

At step S234, the public device 206 can receive a request to perform an interaction with resource provider 212 from user 202. This request may comprise a request to perform a transaction with a merchant resource provider 212. For example, the public device 206 may be a smart TV in a hotel room, and the resource provider 212 may be a pay-pen-view broadcasting company. The request to perform an interaction may comprise a request to purchase pay-per-view content (e.g., a boxing match) from the resource provider 212.

At step S236, public device 206 can collect, from user 202, a first biometric instance corresponding to user 202, The biometric instance can be transformed into a biometric instance, which may in turn be transformed into a first biometric template. The first biometric template may comprise data based on a fingerprint scan, a face scan, an in scan, a retina scan, a DNA sample, a hand-written signature, and/or a voice recording, or any other biometric data. The public device 206 may collect the first biometric instance using any appropriate biometric interface. For example, the public device 206 may capture an iris scan of the user using a camera attached to public device 206. The public device 206 may store the first biometric template in temporary memory.

At step S238, public device 206 can unlock the data vault using the first biometric template, wherein the data vault comprises an interaction token or master secret key locked using a second biometric template corresponding to user 202. That is, the data vault can comprise the interaction token provisioned to communication device 204 at step S228, locked using the biometric template collected at step S214. If the first biometric template and second biometric template both correspond to user 202, the public device should be able to unlock the data vault successfully. In doing so, public device 206 biometrically authenticates user 202. By unlocking the data vault, public device 206 gains access to the interaction token, which can subsequently be used to perform the requested interaction with resource provider 214. After unlocking the data vault, public device 206 can store the interaction token in temporary memory storage.

Figure 5:
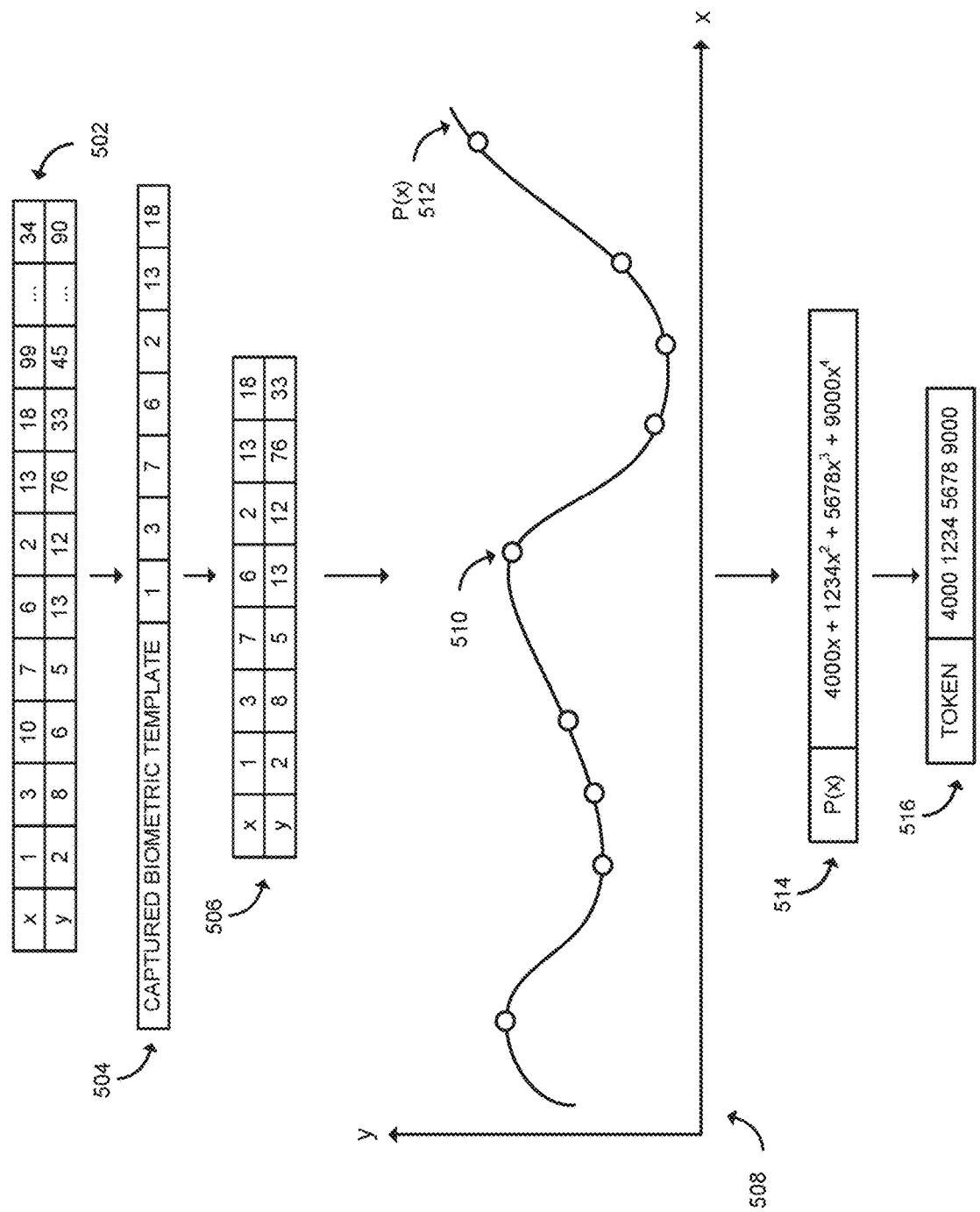
FIG. 5 shows a hybrid diagram of a method of unlocking a data vault formed using a fuzzy vault scheme according to some embodiments.

Step S238 may be better understood with reference to FIG. 5, which shows a hybrid diagram of a method for unlocking a data vault according to some embodiments.

The public device can compare the data vault 502 to the captured biometric template 504 (i.e., the "first biometric template" referenced in step S236 of FIG. 2) in order to determine, by the public device, a subset of the plurality of biometric points 506 corresponding to the first biometric template.

The subset of the plurality of biometric points 506 comprise points that have common values between the determined biometric to 504 and the data vault 502. For various reasons, the determined biometric template 504, determined by the public device (otherwise referred to as the "first biometric template") and the biometric template determined by the communication device, used to lock the da a vault (also referred to as the second biometric template) are not expected to be identical, even though they originate from the same user. For example, if the biometric templates correspond to face scans, the lighting conditions may have been different during the collection of the biometric instances corresponding to the first biometric template and the second biometric template. As another example, if the biometric templates correspond to voice recordings, background noise (e.g., caused by traffic or other background noise) might be more louder during the capture of one biometric instance associated with a biometric template and softer during the capture of the other biometric instance associated biometric template.

As a result, it is expected that the biometric templates do not match exactly, that is not there is not necessarily a biometric point corresponding to each biometric value in captured biometric template 504. However, it is expected that at least some (i.e., a subset) of biometric points will correspond to the captured biometrics template 504. These subset of biometric points 506 may comprise points from the fuzzy vault 502 that share a value (e.g., the "x" value) with biometric template 504.

Graph 508 shows a graphical representation of the subset of biometric points 506. Point 510 is an example of one point be to this subset. Line 512 corresponds to the encoding function P(x) 514. Because the subset of biometric points 506 comprise biometric points, the subset of biometric: points 506 lie on line 512 corresponds to the encoding function P(x) 514.

The public device can then determine the encoding function P(x) 514 based on the subset of the plurality of biometric points. There are a variety of techniques that can be used to determine the encoding function P(x) 514. For example, if the encoding function P(x) 514 is a polynomial function (as shown in FIG. 5), the function can be determined using polynomial interpolation, e.g., by using Lagrange polynomials.

Generally, k unique points rise required in order to define a polynomial of degree k–1. Because of this property, provided the subset of the plurality of biometric points 506 comprises at least k points, the encoding function P(x) 514 can be accurately reconstructed. As an example, for a polynomial encoding function P(x) 514 of degree four (as shown in FIG. 5), the subset of the plurality of biometric points 506 must comprise at least five points. As another example, for a polynomial encoding function P(x) 514 of degree sixteen, the subset of the plurality of biometric points 506 must comprise at least 17 points. This property enables the data vault to be unlocked even under imperfect biometric matching conditions.

The public device can then determine the interaction token 516 based on the encoding function P(x) 514. The public device can make use of, or reverse the process used to generate the encoding function P(x) 514 in order to determine the interaction token 516. For example, if the interaction token 516 was used by the communication device to generate polynomial coefficients, the public device can use the polynomial coefficients in order to generate the interaction token 516. FIG. 5 shows a case in which the polynomial coefficients of the encoding function P(x) 514 (i.e., 4000, 1234, 5678, and 9000) correspond to the digits of the interaction token 516.

Returning to FIG. 2, at step S240, the public device 206 can transmit the interaction token to the resource provider 212 in order to initiate the interaction requested by the user at step S234. The interaction token can be transmitted to the resource provider 212 via any appropriate means, e.g., using a network such as the Internet. The interaction token can be transmitted in encrypted or unencrypted form.

At step S242, public device 206 can perform the interaction with resource provider 212. The interaction may take many forms, depending on the nature of the public device 206 and resource provider 212. As an example, if public device 206 is a smart TV, the interaction may comprise the user 202 purchasing pay-per-view content from resource provider 212 (i.e., a broadcasting company associated with a sports league). Alternatively, if public device 206 is a security system used to control access to a building (a resource) managed by a building manager (resource provider 212), the interaction may comprise resource provider 212 automatically unlocking an electronic controlled door upon receiving the interaction token at step S240. Two examples of interactions are described in more detail below with reference to FIGS. 6 and 7.

After transmitting the interaction token to the resource provider at step S240, public device 206 can delete the first biometric template and the interaction token from temporary memory storage, in order to preserve the privacy of user 202 and prevent the first biometric template and interaction token from being acquired by hackers, fraudsters, or malicious users of public device 206. This cleanup step can be enforced by the previously described authentication server computer.

Figure 3A:
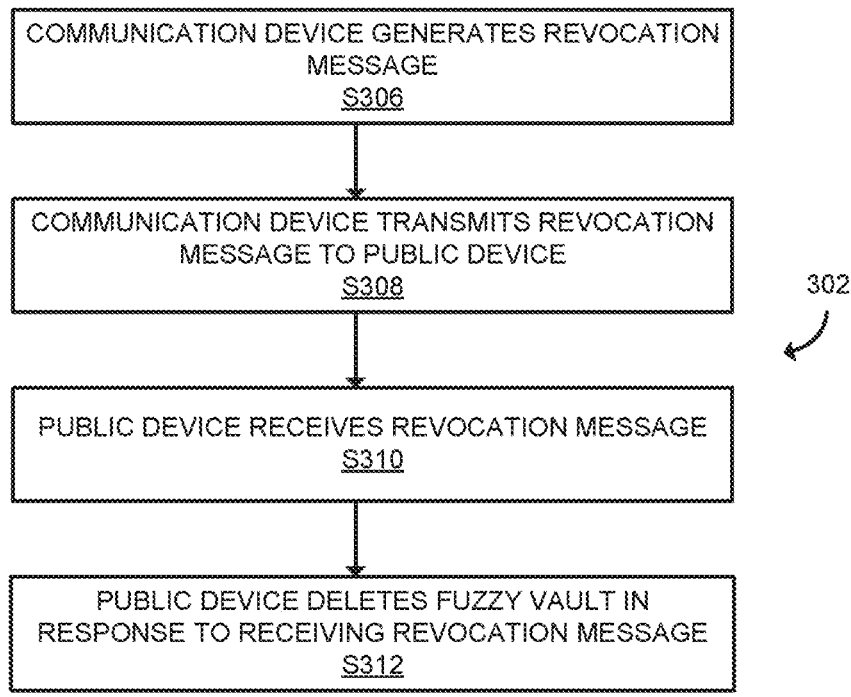
FIG. 3A shows a flowchart of method of fuzzy vault revocation according to some embodiments.
Figure 3B:
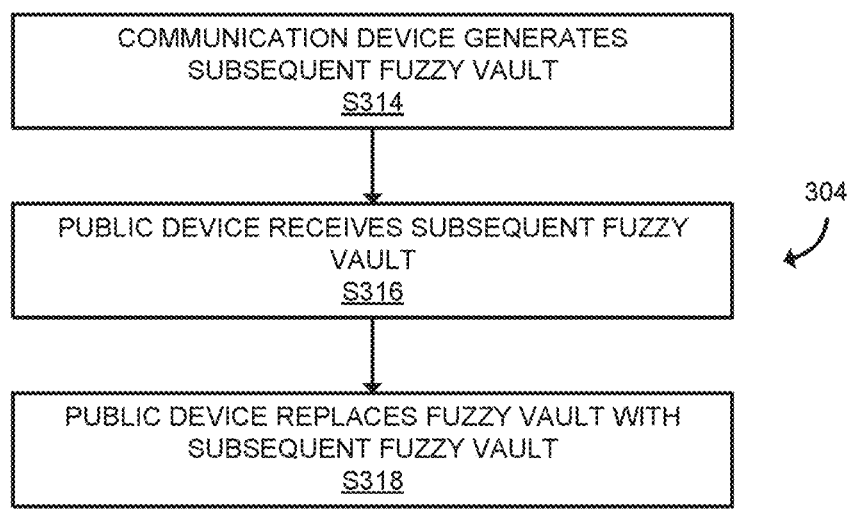
FIG. 3B shows a flowchart of a method of fuzzy vault replacement scheme according to some embodiment.

The delegated biometric authentication system may support additional features that can provide more convenience and security to users. These additional features may include delegation revocation features, including user initiated revocation and other forms of revocation. These additional features may also include recurring biometric authentication delegation. FIGS. 3A and 3B show flowcharts corresponding to methods of revocation and recurring biometric authentication delegation respectively, FIG. 3A shows a flowchart 302 corresponding to a method of biometric authentication revocation according to some embodiments. An entity, such as the user, the authentication server computer, the token server computer, or another entity (e.g., an issuer) can revoke the ability of the pub dc device to perform biometric authentication. This may be useful when the user no longer wishes to use the public device to perform interactions. For example, a user may have been staying at a hotel with a smart TV public device in their room. Over the duration of their stay, the user may use the smart TV in order to purchase pay-per-view content, such as broadcasts of boxing matches. However, when the user checks out of the hotel, the user may no longer need to purchase content using the smart TV, and may want to revoke the data vault.

At step S306, the communication device may generate a revocation message. The revocation message may indicate that the user wishes to revoke the data vault stored on the public device. The revocation message may comprise a user identifier or communication device identifier used to identify the data vault associated with the user or communication device.

At step S308, the communication device can transmit the revocation message to the pubic device, e.g., via Bluetooth, Wi-Fi, Zigbee, NFC, LAN, the Internet, etc.

At step S310, the public device can receive the revocation message from the communication device. In other embodiments, the revocation message can be received from an authentication server computer.

At step S312, in response to receiving the revocation message, the public device can delete the data vault from memory. Additionally or alternatively, the public device or the communication device can transmit a request to the authentication server computer or token server computer in order to request expiration of the interaction token.

Alternatively, the revocation message may not be generated by the user, and may instead be generated by another entity, such as the authentication server computer, token server computer, or an issuer. For example, if the interaction token is a limited time token or a limited use token and expires, the token server computer can transmit a revocation message to the public device in order to revoke the data vault corresponding to the interaction token. Alternatively, if the user unsubscribes from the biometric authentication service, the authentication server computer can issue the revocation message to the public device. As another example, if an issuer (e.g., an issuer managing a payment account for the user) suspects misuse of the interaction token (e.g., fraudulent spending using the interaction token), the issuer may transmit the revocation message to the public device.

The revocation process may additionally comprise the user verifying their identity in some way, in order to determine that the user, and not a malicious entity is attempting to revoke the data vault. The user may verify their identity by providing a biometric template to the public device (e.g., by using a camera on the public device to perform an iris scan). The public device may open the data vault using the biometric template to verify the users identity, then delete the data vault as part of the revocation process.

FIG. 3B shows a method of performing repeated delegated biometric authentication according to some embodiments. This can be convenient to users t at periodically make use of a public, device to perform interactions. For example, user visits a particular grocery store every few weeks to purchase groceries, or visits a library every few weeks in order to check out books. Using recurring delegated biometric authentication, a user can take advantage of the security benefits of using limited interaction tokens (e.g., limited time tokens) while still retaining the convenience associated with delegated biometric authentication. As an example, using recurring delegated biometric authentication, a user's communication device can generate a new data vault every week and transmit the data vault to the public device, replacing the data vault from the previous week.

At step S314, the communication device can generate a subsequent data vault. The subsequent data vault may comprise a subsequent interaction token locked using the second biometric template (i.e., the biometric template used to generate the original data vault in step S230 of FIG. 2), or a subsequent biometric template corresponding to the user.

At step S316, the public device can receive the subsequent data vault from the communication device. The public device can receive the subsequent data vault via any appropriate communication means, for example, Bluetooth or NFC as described above.

At step S318, the public device can replace the data vault with the subsequent data vault. This may comprise, for example, deleting the data vault from memory and storing the subsequent data vault in memory.

Figure 6:
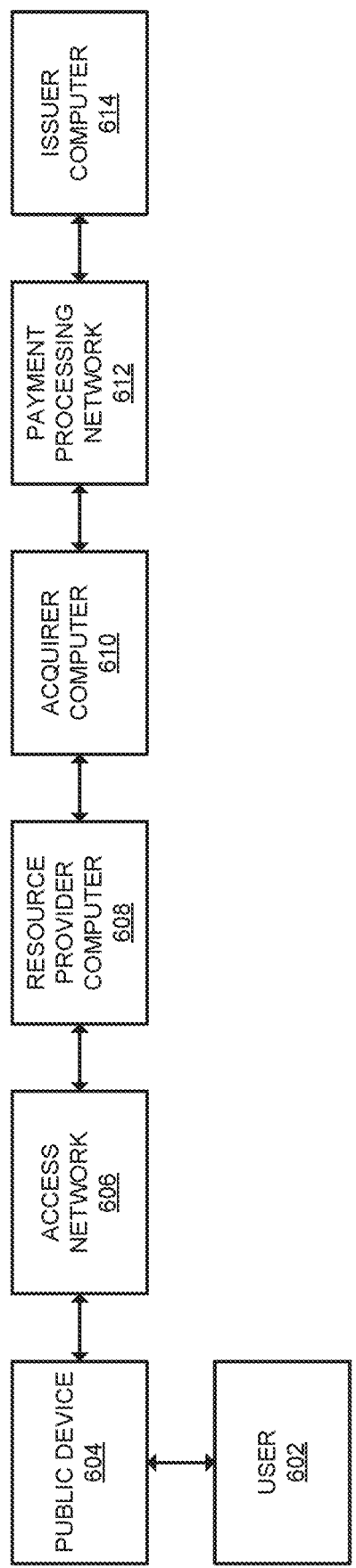
FIG. 6 shows a system block diagram used to illustrate a first exemplary interaction according to some embodiments.
Figure 7:
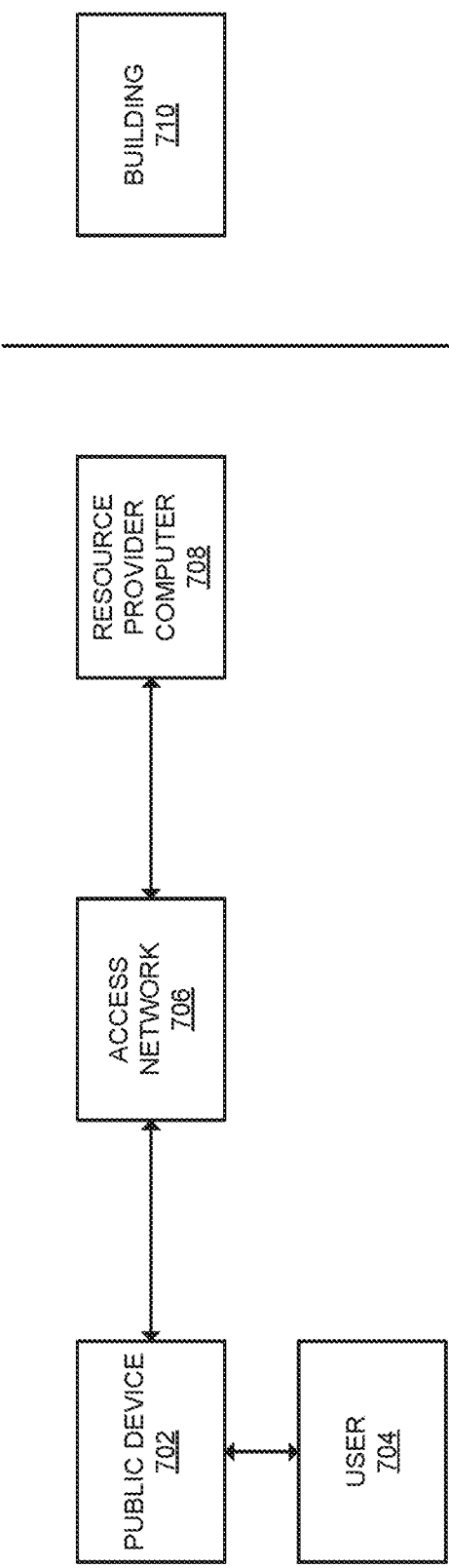
FIG. 7 shows a system block diagram used to illustrate a second exemplary interaction according to some embodiments.

Interactions and interaction networks may be better understood with reference to FIGS. 6-7 and the following description. FIG. 6 shows an example of a transaction processing system used to perform transaction interactions. FIG. 7 shows an example of a building access network used to perform access interactions (i.e., grant building access to a user).

FIG. 6 shows a block diagram of a transaction processing system that can be used to perform interactions between users and resource providers. Interaction network 110 from FIG. 1 may comprise one or more computers or entities of the transaction processing system of FIG. 6. FIG. 6 shows a user 602 that can operate public device 604. The user 602 may use the public device 604 to perform a transaction interaction with a resource provider. The resource provider may operate resource provider computer 608. Access network 606 (e.g., a network such as the Internet) may be used to enable communications between public device 604 and resource provider computer 608. The resource provider computer 608 may communicate with the issuer computer 614 via an acquirer computer 610 and a payment processing network 612.

The payment processing network 612 may include data processing subsystems, networks, and operations used to support and deliver authorization services, exception file services, and clearing and settlement services. An exemplary payment processing network 612 may include VisaNet™. Payment processing networks such as VisaNet™ are able to process credit card transactions, debit cards transaction, and other types of commercial transactions. VisaNet™, in particular, includes a VIP system (Visa Integrated Payments system) which processes authorization requests and a Base II system which performs clearing and settlement services. The payment processing network may use any suitable wired or wireless network, including the Internet.

A typical payment transaction flow involving public device 604 can be described as follows. A user 602 has a first biometric template captured by public device 604 (e.g., public device 604 scans user's 602 face using a camera). Public device 604 uses the first biometric template to unlock a data vault corresponding to user 602, as described above. In doing so, public device 604 gains access to an interaction token (e g., a payment token) that can be used to authorize an interaction between user 602 and the resource provider. The interaction token can securely transmitted (e.g., transmitted in encrypted form) from public device 604 to resource provider computer 608. Resource provider computer 608 may then generate an authorization request message that includes the interaction token, along with additional transaction information (such as an amount or cost associated with the transaction, a merchant identifier or category code, a timestamp, etc.) and electronically transmits this information to acquirer computer 610. Acquirer computer 610 may then receive, process, and forward the authorization request message to the issuer computer 614 via the payment processing network 612 for authorization. The issuer computer 614 may reply with an authorization response message. The authorization response message may be transmitted from the issuer computer 614 to the resource provider computer 608 via payment processing network 612 and acquirer computer 608. The authorization response message may be forwarded to public device 604 via resource provider 608 and access network 606. After receiving the authorization response message, the resource provider associated with resource provider computer 608 can provide a good or service to user 602 via public device 604. For example, the resource provider computer 808 can transmit a video file to public device 604, which the user 602 can then watch.

At the end of the day or at some other suitable time interval, a clearing and settlement process between the acquirer computer 610, the payment processing network 612, and the issuer computer 614 may be performed.

FIG. 7 shows a block diagram of a building access system that can be implemented using some embodiments. FIG. 7 shows a public device 702 operated by user 704. The public device 702 can communicate with resource provider computer 708 via access network 706. Resource provider computer 708 may be used to control access to building 710, e.g., resource provider computer 708 may engage or disengage an electronic lock in order to lock or unlock a door to building 710.

As an example, budding 710 may be an apartment complex located on a busy street. For the security of residents, building 710 may require biometric authentication in order to enter user 704 may be a resident of building 710, and may approach the public device 702 for biometric authentication. Public device 702 may collect a first biometric template from user 704 and use the first biometric template to unlock a data vault locked with a second biometric template corresponding to the user, and containing an interaction token. Public device 702 may transmit the interaction token to resource provider computer 708 via access network 706. The resource provider computer 708 may verify the interaction token and unlock the door to building 710 allowing user 704 to enter.

Figure 8:
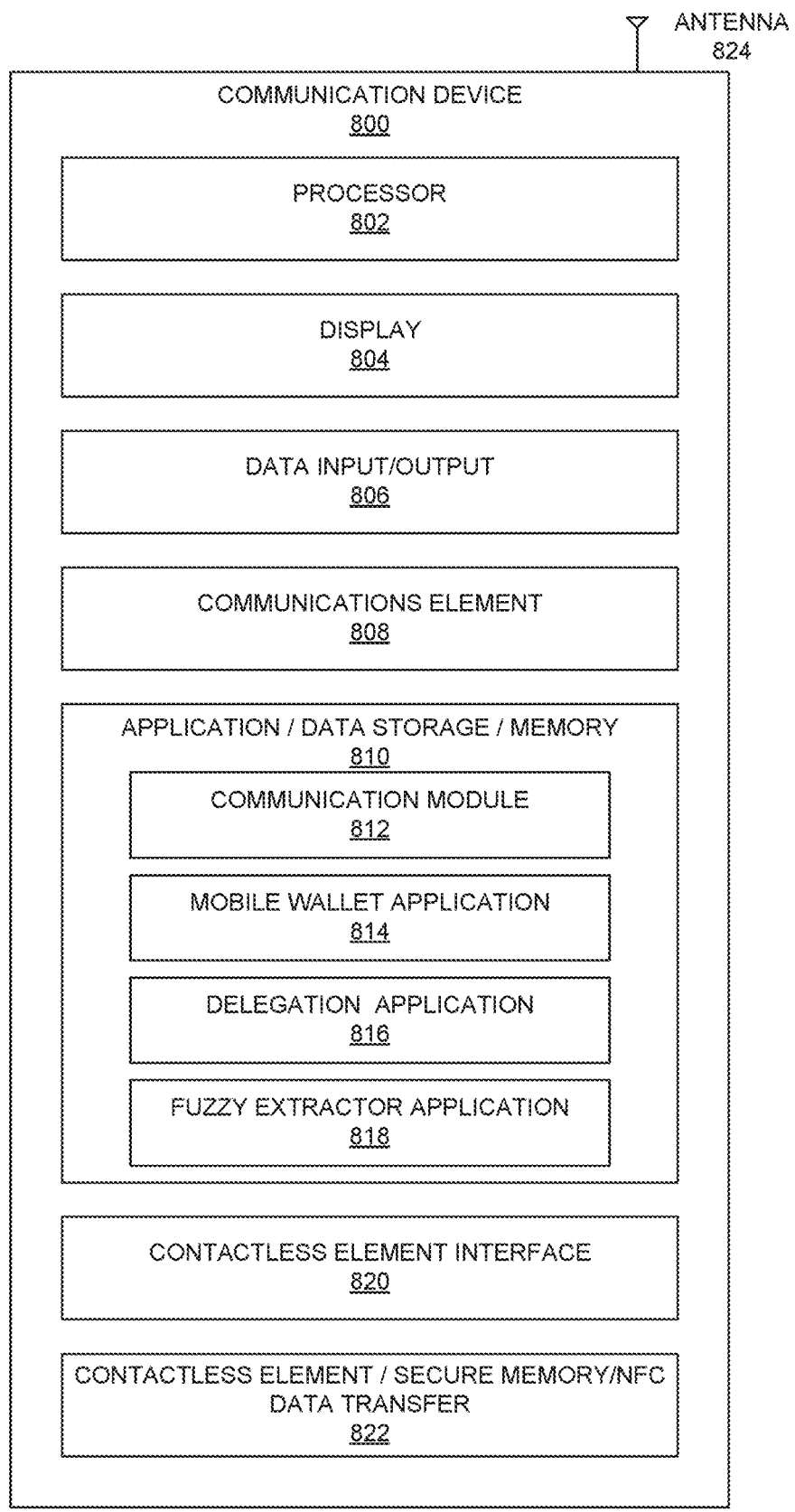
FIG. 8 shows a system block diagram of an exemplary communication device according to some embodiments.

FIG. 8 shows an exemplary communication device 800 according to some embodiments. Communication device 800 may include circuitry that is used to enable certain device functions, such as wireless communication or telephony. The functional elements responsible for enabling those functions may include a processor 802 that can execute instructions that implement the functions and operations of the device. Processor 802 may access data storage 810 (or another suitable memory region or element) to retrieve instructions or data used in executing the instructions. Data input/output element 806, such as a keyboard or touchscreen, may be used to enable a user to operate the communication device 800 (for example, allowing the user to navigate to a mobile wallet application 814). Data input/output 806 may also be configured to output data (via a speaker, for example). Display 804 may also be used to output data to a user. Communications element 808 may be used to enable data transfer between communication device 800 and a wired or wireless network (via antenna 824, for example), enable data transfer functions, and may be used to assist in connectivity to the Internet or another network. Communication device 800 may also include contactless element interface 820 to enable data transfer between contactless element 822 and other elements of the device. Contactless element 820 may include a secure memory and a near field communication data transfer element (or another form of short range communication technology). As noted, cellular phones, smart phones, wearable devices, laptop computers, or other similar devices are examples of communication devices in accordance with embodiments.

The data storage 810 may comprise a computer readable medium that may comprise a number of software modules, such as communications module 812 mobile wallet application 814, delegation application 816 and fuzzy extractor application 818.

The communications module 812 may comprise code enabling the processor 802 to implement or enable communications between the communications device 800 and other devices, such as other mobile devices or an access terminal. The communications module 812 may allow communication according to any appropriate protocol, such as TCP, UDP, IS-IS, OSPF, IGRP, EIGRP, RIP, BGP, etc. The communications module 812 may allow secure communication by enabling the processor 802 to establish a secure or encrypted communication channel between the communication device 800 and other devices. For example, the communications module 812 may comprise code, executable by processor 802 for performing a key exchange (such as a Diffie-Hellman key exchange) between communication device 800 and another device, such as the public device. The communications module 812 may allow the transmission of data vaults to other devices, such as a public device.

The mobile wallet application 814 may comprise code enabling the communication device 800 to manage tokens, including interaction tokens and other payment credentials. For example, the mobile wallet application 814 may comprise code enabling the processor 802 to retrieve access tokens stored in secure memory 822 via contactless element interface 820. The mobile wallet application 814 may further comprise code enabling the communications device 800 to display any suitable token information, for example, the time and date during which an interaction token was provisioned, an alias or identifier corresponding to an interaction token, the time and date of the most recent interaction involving the interaction token, etc. Further, the mobile wallet application 814 may comprise code enabling the processor 802 to display a graphical user interface (GUI) that enables a user to activate token related functionality.

The delegation application 816 may comprise code enabling the communication device 800 to perform any and all methods involved in a delegate biometric authentication process. These methods may be better understood with reference to the description above and FIGS. 2-4. The delegation application 816 may have been provisioned to communication device 800 during an enrollment process, e.g., with authentication server computer 112 from FIG. 1.

The functions of delegation application 816 may include capturing biometric instances via data input/output 806. A user may use communication device 800 to capture an initial biometric template (such as a face scan) used to lock an interaction token in a data vault using fuzzy vault method, as described above with reference to FIG. 2. The delegation application 816 may be used to capture the biometric template and store the template in encrypted or unencrypted form on secure memory 822.

Fuzzy extractor application 818 may comprise code enabling the communication device 800 to perform any functions associated with generating data vaults. These functions may include generating encoding functions based on interaction tokens, generating biometric points by applying a biometric template as the input to the encoding function, generating random or chaff points, and packaging or grouping the biometric points and random points into a data vault, as described above with reference to FIG. 4. The fuzzy extractor application 818 may make use of any appropriate mathematical libraries to perform these functions, such as libraries associated with random or pseudorandom number generation, generating of encoding functions, and functional analysis.

Figure 9:
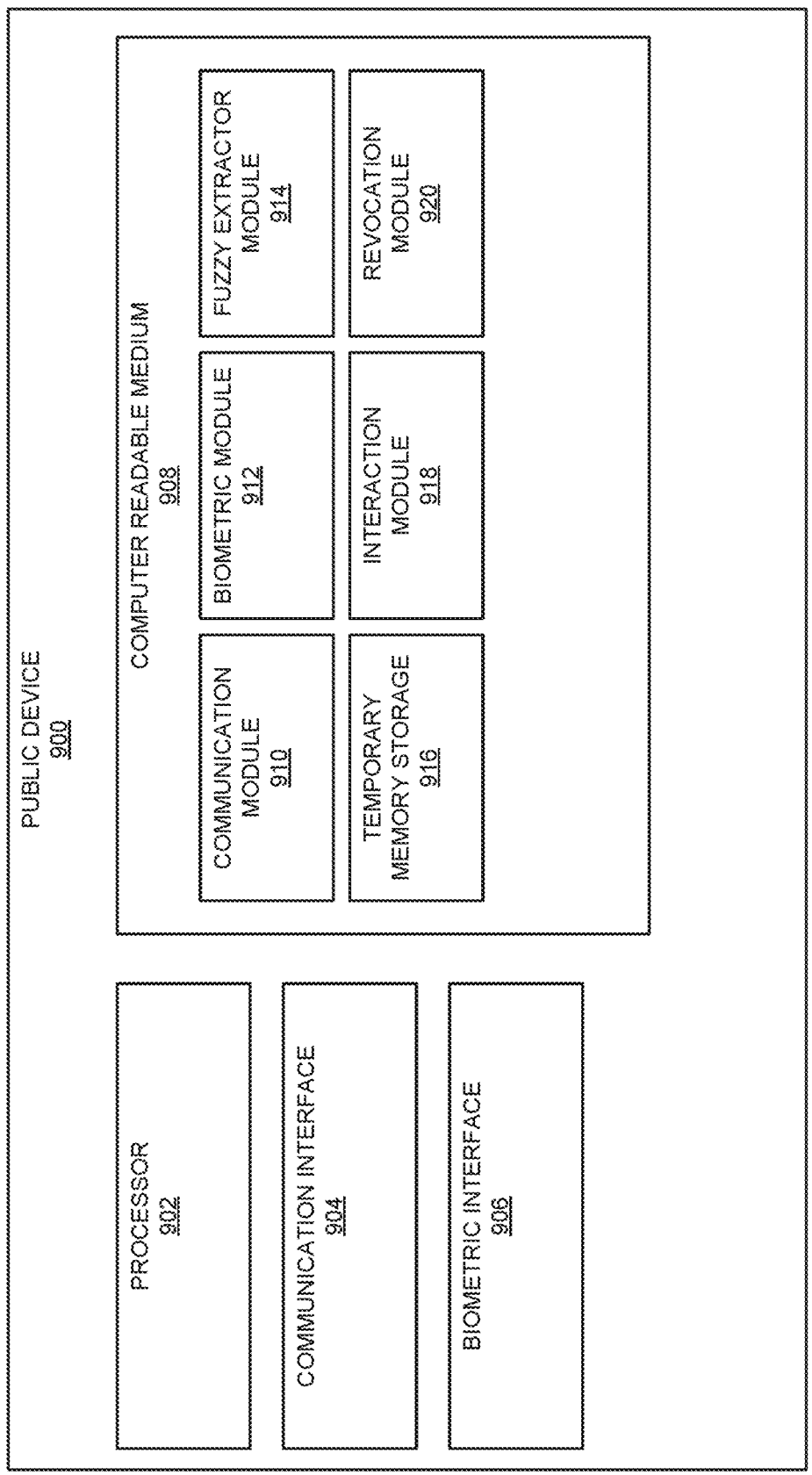
FIG. 9 shows a system block diagram of an exemplary public device according to some embodiments.

FIG. 9 shows an exemplary public device 900 according to some embodiments. Public device 900 may comprise a processor 902, a communication interface 904, a biometric interface 906 and a computer readable medium 908. The computer readable medium 908 may comprise a number of software modules, including a communication module 910, a biometric module 912, a fuzzy extractor module 914, a temporary memory storage 916, an interaction module 918, and a revocation module 920.

The processor 902 may be any suitable processing apparatus or device as described above. The communication interface 904 may comprise a network interface that enables the public device 900 to communicate with other computers or systems over a network such as the Internet. The communication interface 904 may comprise an additional interface on interface that enables the public device 900 to communicate with other computers or systems. For example, the communication interface 904 may comprise a near field communication interface or the like.

Biometric interface 906 may comprise hardware used to capture biometric instances from users. As an example, biometric interface 906 may comprise an iris scanner, including a low energy infrared light emitter and infrared light detector. The retina scanner may shine infrared light onto a user's eye, then record reflected infrared light picked up by the detector. The recorded light may be compiled into a biometric template that can be stored on computer readable medium 908, e.g., in temporary memory storage 916. Biometric interface 906 may be supported by the biometric software module 912, which may comprise code executable by processor 902 for controlling the operation of biometric interface 906. As an example, the biometric module 912 may comprise signal processing algorithms or optical processing algorithms used to convert a captured biometric into a biometric template.

Communication module 910 may comprise code that causes or enables processor 902 to generate messages, reformat messages, and/or otherwise communicate with other entities or computers. This may include communicating with communication devices, receiving data vaults from communication devices, and transmitting interaction tokens to resource provider computers or otherwise communicating with resource provider computers. Communication module 910 may enable the public device to communicate over a network according to any appropriate communication protocol such as TCP, UDP, etc.

Fuzzy extractor module 914 may comprise code or instructions, executable by processor 902 for storing and unlocking data vaults, as described above with reference to FIGS. 2 and 5. These code or instructions may include, for example, using a captured biometric to determine a subset of biometric points corresponding to a data vault, interpolating an encoding function, and determining an interaction token based or the encoding function. Fuzzy extractor nodule 914 may be used to store and manage data vaults corresponding to a variety of users (i.e., more than one). Fuzzy extractor module 914 may additionally store or associate data vaults with user identifiers or communication device identifiers.

Temporary memory storage 916 may comprise code or instructions, executable by processor 902 for temporarily storing digital materials. These may include interaction tokens and biometrics collected via biometric interface 906. These temporary materials may be stored by public device 900 while they are needed and deleted afterwards.

Interaction module 918 may comprise code or instructions, executable by processor 902 for conducting interactions with resource providers, e.g., as described above with reference to FIGS. 6-7. These instructions may include instructions for generating interaction messages comprising interaction tokens and transmitting those interaction messages to resource providers. The instructions may also include instructions for receiving and interpreting authorization response messages received by resource providers.

Figure 10:
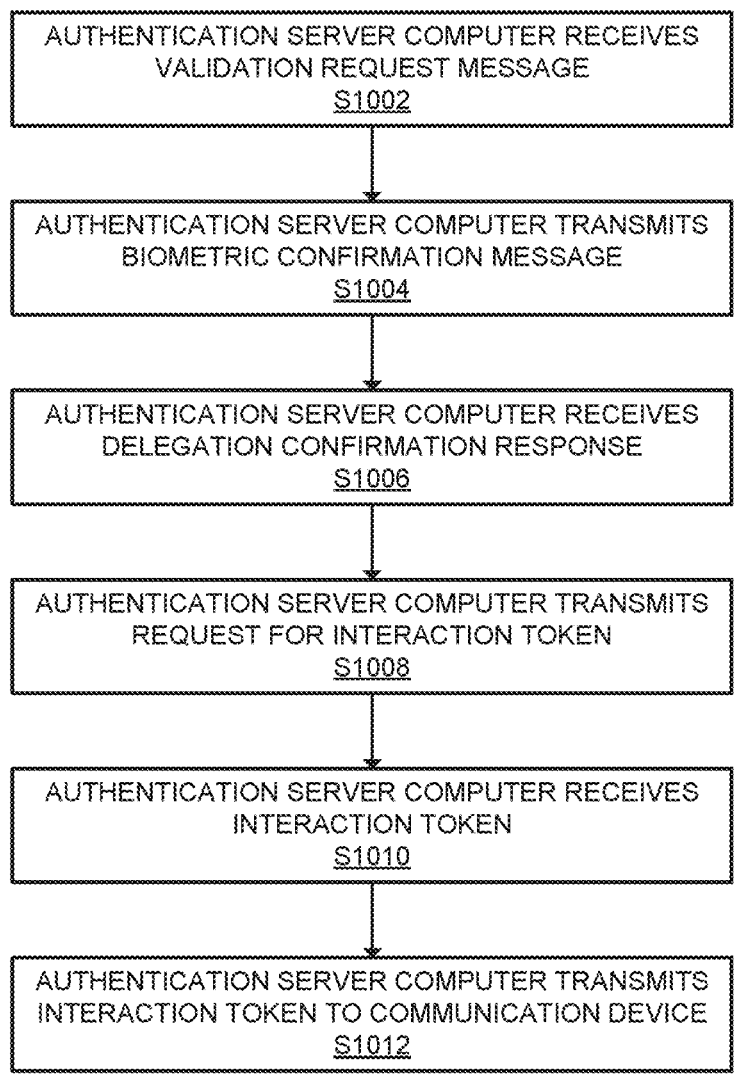
FIG. 10 shows an exemplary method performed by an authentication server computer according to some embodiments.

Revocation module 920 may comprise code or instructions, executable by processor 902 for revoking data vaults, as described above with reference to FIG. 3. These instructions may include instructions for receiving, interpreting, and validating revocation messages and deleting data, vaults from computer readable medium 908, FIG. 10 shows a flowchart of an exemplary method performed by a authentication server computer according to some embodiments.

At step S1002, the authentication server computer can receive, from the public device, a validation request message, the validation request message including an identifier of a communication device associated with a user. The validation request message may indicate that the public device wants to validate that the user is enrolled in a biometric authentication system and is a legitimate user of the system, as described above with reference to FIG. 2. The authentication server computer may use the identifier of the communication device in order to route messages to the communication device.

At step S1004, the authentication server computer can transmit a delegation confirmation message to the communication device. The authentication server computer can use the identifier of the communication device in order to transmit the delegation confirmation message to the communication device. The delegation confirmation message may request confirmation from the user or communication device that the biometric authentication delegation is a legitimate delegation request, as described above with reference to FIG. 2.

At step S1006, the authentication server computer can receive, from the communication device, a delegation confirmation response. The delegation confirmation response can indicate whether the biometric delegation is legitimate or fraudulent. The delegation confirmation response may comprise an affirmative confirmation, indicating that the user is actually attempting to delegate biometric authentication to the public device, as described above with reference to FIG. 2.

At step S1008, the authentication server computer can transmit, to a token server computer, a request for an interaction token, as described above with reference to step S226 of FIG. 2.

At step S1010, the authentication server computer can receive, from the token server computer, an interaction token in response to the request for interaction token, as described above with reference to step S228 of FIG. 2.

At step S1012, the authentication server computer can transmit, to the communication device, the interaction token, wherein the communication device locks the interaction token in a data vault using a biometric template associated with the user, as described above with reference to FIGS. 4 and S230 of FIG. 2.

An advantage of embodiments of the invention is that at the time of authentication, a biometric template is created and used at the time of authentication, and is discarded immediately afterwards. The biometric template created at the time of authentication is not tied to a specific identity, and it is only used to check if it can unlock a vault. So, the public device never learns about the exact identity of the user (preserves privacy). Another advantage is that the enrollment templates not sent from the users private communication device device to the public device during enrollment or authentication. A benefit of this is greater security.

Any of the computer systems mentioned herein may utilize any suitable number of subsystems. In some embodiments, a computer system includes a single computer apparatus, where the subsystems can be components of the computer apparatus. In other embodiments, a computer system can include multiple computer apparatuses each being a subsystem, with internal components.

A computer system can include a plurality of, the components or subsystems, e.g., connected together by external interface or by an internal interface. In some embodiments, computer systems, subsystems, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g., an application specific integrated circuit or field programmable gate array) and/or using computer software with a generally programmable processor in a modular or integrated manner. As used herein a processor includes a single-core processor, multi-core processor on a same integrated chip, or multiple processing units on a single circuit board or networked Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g., a hard drive, a CD, or an entire computer system), and may be present on or within different computer products within a system or network. A computer system may include a monitor, printer or other suitable display for providing any of the results mentioned herein to a user.

Any of the methods described herein may be totally or partially performed with a computer system including one or more processors, which can be configured to perform the steps. Thus, embodiments can involve computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, and of the steps of any of the methods can be performed with modules, circuits, or other means for performing these steps.

The specific details of particular embodiments may be combined in any suitable manner without departing from the spirit and scope of embodiments of the invention. However, other embodiments of the invention may be involve specific embodiments relating to each individual aspect, or specific combinations of these individual aspects. The above description of exemplary embodiments of the invention has been presented for the purpose of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications and description mentioned herein are incorporated by reference in their entirety for ail purposes. None is admitted to be prior art.

What is claimed is:

1. A method comprising:
   receiving, by an authentication server computer, from a public device, a validation request message, the validation request message including an identifier of a communication device associated with a user;
   transmitting, by the authentication server computer, to the communication device, a delegation confirmation message;
   receiving, by the authentication server computer, from the communication device, a delegation confirmation response;
   transmitting, by the authentication server computer, to a token server computer, a request for an interaction token;
   receiving, by the authentication server computer, from the token server computer, the interaction token; and
   transmitting, by the authentication server computer, to the communication device, the interaction token, wherein the communication device locks the interaction token in a data vault using a biometric template associated with the user.

2. The method of claim 1, wherein the data vault was formed using a fuzzy vault scheme.

3. The method of claim 1, wherein the communication device transmits the data vault to the public device which stores the data vault.

4. The method of claim 1, wherein the data vault comprises a number of random points.

5. The method of claim 1, wherein the communication device is a mobile phone.

6. The method of claim 1, wherein the communication device transmits the data vault to the public device which stores the data vault, and wherein the communication device is a mobile phone and the public device is a computational device generally accessible to the public.

7. The method of claim 1, wherein the validation request message further comprises a user identifier.

8. The method of claim 1, wherein the delegation confirmation message comprises a prompt which requests confirmation from the user of the communication device regarding a desire to delegate biometric authentication to the public device.

9. The method of claim 1, wherein the interaction token can be used for has a limited number of interactions for which the interaction token can be used by the user.

10. The method of claim 1, wherein the data vault is in the form of a two-dimensional array of points comprising a plurality of biometric points and a plurality of random points.

11. The method of claim 1, wherein the authentication server computer maintains a registry of users and communication devices.

12. The method of claim 1, wherein the interaction token is a substitute for a credential.

13. The method of claim 1, wherein the biometric template is derived from a face scan, an iris scan, a retina scan, a thumbprint scan, or a voice recording.

14. An authentication server computer comprising:
a processor; and
a non-transitory computer readable medium comprising code, when executed by the processor, causes the authentication server computer to perform operations comprising:
receiving, from a public device, a validation request message, the validation request message including an identifier of a communication device associated with a user;
transmitting to the communication device, a delegation confirmation message;
receiving from the communication device, a delegation confirmation response;
transmitting to a token server computer, a request for an interaction token;
receiving from the token server computer, the interaction token; and
transmitting to the communication device, the interaction token, wherein the communication device locks the interaction token in a data vault using a biometric template associated with the user.

15. The authentication server computer of claim 14, wherein the interaction token is a substitute for a credential.

16. The authentication server computer of claim 14, further comprising a database comprising a registry of users and communication devices.

17. The authentication server computer of claim 14, wherein the identifier of the communication device is a phone number.

18. The authentication server computer of claim 14, wherein the validation request message further comprises a user identifier.

19. A system comprising:
an authentication server computer comprising
a first processor, and
a first non-transitory computer readable medium comprising code, when executed by the first processor, causes the authentication server computer to perform operations comprising:
receiving, from a public device, a validation request message, the validation request message including an identifier of a communication device associated with a user,
transmitting to the communication device, a delegation confirmation message,
receiving from the communication device, a delegation confirmation response,
transmitting to a token server computer, a request for an interaction token,
receiving from the token server computer, the interaction token, and
transmitting to the communication device, the interaction token, wherein the communication device locks the interaction token in a data vault using a biometric template associated with the user; and
the token server computer comprising,
a second processor, and
a second non-transitory computer readable medium comprising code, when executed by the second processor, causes the authentication server computer to perform operations comprising,
receiving the request for the interaction token from the authentication server computer, and
transmitting the interaction token to the authentication server computer.

20. The system of claim 19, further comprising the communication device.

* * * * *